(12) United States Patent
Lee (10) Patent No.: US 12,379,713 B1
(45) Date of Patent: Aug. 5, 2025

(54) CONSTRUCTION WORKSTATION WITH ROTATABLE PLATFORM

(71) Applicant: Applied Robotics, Inc., Oakland, CA (US)

(72) Inventor: Brent Lee, Saratoga, CA (US)

(73) Assignee: Applied Robotics, Inc., Oakland, CA (US)

( * ) Notice: Subject to any disclaimer, the term of this patent is extended or adjusted under 35 U.S.C. 154(b) by 0 days.

(21) Appl. No.: 19/018,407

(22) Filed: Jan. 13, 2025

(51) Int. Cl.
*G05B 19/418* (2006.01)
*B25J 9/16* (2006.01)
*E04F 21/02* (2006.01)
*E04F 21/18* (2006.01)

(52) U.S. Cl.
CPC ...... *G05B 19/41825* (2013.01); *B25J 9/1664* (2013.01); *E04F 21/02* (2013.01); *E04F 21/18* (2013.01); *G05B 2219/31229* (2013.01)

(58) Field of Classification Search
CPC ..... G05B 19/41825; G05B 2219/31229; B25J 9/1664; B25J 5/00; B25J 5/007; E04F 21/02; E04F 21/18; Y10T 408/37
See application file for complete search history.

(56) References Cited

U.S. PATENT DOCUMENTS

| | | | | |
|---|---|---|---|---|
| 3,570,369 A * | 3/1971 | Hoddinott | ................. | B23C 1/00 409/211 |
| 3,760,472 A * | 9/1973 | Kielma | ................. | B23B 39/02 409/80 |
| 3,950,914 A * | 4/1976 | Lowen | ................. | E04G 21/22 414/10 |
| 4,738,572 A * | 4/1988 | Kitamura | ............ | B23Q 39/024 408/35 |
| 4,833,764 A * | 5/1989 | Muller | ................. | B23Q 39/02 409/203 |
| 5,454,775 A * | 10/1995 | Cullen | ............... | G05B 19/4189 483/69 |
| 8,825,208 B1* | 9/2014 | Benson | ................. | E04F 21/02 700/247 |
| 9,720,414 B1* | 8/2017 | Theobald | ................. | B25J 5/007 |
| 9,995,047 B2* | 6/2018 | Raman | ................. | G05D 1/0214 |
| 10,513,856 B2* | 12/2019 | Telleria | ................. | B25J 15/0019 |
| 10,577,810 B2* | 3/2020 | Telleria | ................. | B05B 13/0431 |
| 11,090,674 B2* | 8/2021 | Raman | ................. | B05B 13/0431 |

(Continued)

FOREIGN PATENT DOCUMENTS

| CN | 107116560 A | * | 9/2017 |
|---|---|---|---|
| CN | 115522715 A | * | 12/2022 |

(Continued)

*Primary Examiner* — Steve Clemmons
(74) *Attorney, Agent, or Firm* — Procopio, Cory, Hargreaves & Savitch LLP (57) ABSTRACT

Described herein is a construction workstation, which can involve a base portion having a plurality of wheels configured to move the construction workstation; a lift portion; a rotatable platform portion configured to be raised or lowered by the lift portion, the rotatable portion comprising a plurality of tools installed on the rotatable platform portion, the plurality of tools facing outward from the construction workstation, the rotatable platform portion configured to rotate; and one or more supply containers disposed in the base portion and connected to each of the plurality of tools to supply the each of the plurality of tools.

19 Claims, 7 Drawing Sheets

(56) References Cited

U.S. PATENT DOCUMENTS

| | | | |
|---|---|---|---|
| 11,654,561 B2* | 5/2023 | Askey | B25J 9/1684 |
| | | | 700/245 |
| 11,673,783 B1* | 6/2023 | Brunk, III | B66F 11/046 |
| | | | 182/63.1 |
| 11,724,404 B2* | 8/2023 | Telleria | B25J 9/1697 |
| | | | 700/160 |
| 11,739,542 B2* | 8/2023 | Furrer | E04F 21/023 |
| | | | 700/253 |
| 11,919,019 B2* | 3/2024 | Raman | G05D 1/249 |
| 11,989,009 B2 | 5/2024 | Neilan, II et al. | |
| 12,123,205 B2 | 10/2024 | Telleria et al. | |
| 2010/0143089 A1* | 6/2010 | Hvass | G05D 1/027 |
| | | | 414/754 |
| 2012/0053726 A1* | 3/2012 | Peters | B25J 11/00 |
| | | | 700/254 |
| 2013/0119033 A1* | 5/2013 | Lipnevicius | B25J 5/00 |
| | | | 219/136 |
| 2015/0050111 A1* | 2/2015 | Townsend | B25J 19/005 |
| | | | 414/815 |
| 2015/0147460 A1* | 5/2015 | Manzi | B05B 12/122 |
| | | | 118/713 |
| 2016/0121486 A1* | 5/2016 | Lipinski | B05B 13/0431 |
| | | | 427/427.3 |
| 2019/0118209 A1* | 4/2019 | Rennuit | B25J 13/06 |
| 2021/0308710 A1* | 10/2021 | Asadi | B05B 15/55 |
| 2024/0183177 A1 | 6/2024 | Telleria et al. | |

FOREIGN PATENT DOCUMENTS

| | | | | |
|---|---|---|---|---|
| DE | 202024106485 U1 * | 2/2025 | | |
| GB | 2292365 A * | 2/1996 | | B25J 15/0491 |
| KR | 1020230162958 A | 11/2023 | | |
| WO | WO-2020225487 A1 * | 11/2020 | | |

* cited by examiner

CONSTRUCTION WORKSTATION WITH ROTATABLE PLATFORM

BACKGROUND

Field

The present disclosure is generally directed to construction assets, and more specifically, to a construction workstation with a rotatable platform.

Related Art

Construction, in particular home construction. is a labor intensive industry in which bodily injuries are commonly incurred. Over time, construction costs become more expensive as human labor becomes injured, ages out of the industry, or is otherwise lost through attrition. In the related art, there have been innovations to replace portions of human labor with robotic devices. In this vein, the present disclosure involves a new type of construction workstation to replace portions of human labor with robotic labor and reduce human injury.

SUMMARY

Example implementations described herein involve a construction workstation with rotatable platform. The construction rotation has a plurality of different types of tools on rotatable platform that can rotate to the desired tool for the particular construction job. When a construction job is completed, the job can be repeated or a different tool can be selected and rotated to continue onto the next job, thus lending more versatility than related art construction workstations.

Example implementations involve lightweight tools on the platform so that the platform can be elevated or lowered by a flexible lift, allowing access to elevated locations on a building, from the outside or from the inside. The construction workstation is also programmable or controllable by a control panel or by a user device so that remote interaction by a user, or autonomous operation of the construction platform can be conducted in accordance with the desired implementation.

In addition, because of the configuration of the platform and workstation, only two-dimensional movement needs to be considered (e.g., up, down, left, right) to complete the same task as a robotic arm, which allows the proposed example implementations to be simpler than the three-dimensional programming required by a robotic arm.

Aspects of the present disclosure can involve a construction workstation, which can involve a base portion including a plurality of wheels configured to move the construction workstation; a lift portion connected to the base portion; a rotatable platform portion configured to be raised or lowered by the lift portion, the rotatable portion involving a plurality of tools installed on the rotatable platform portion, the plurality of tools facing outward from the construction workstation, the rotatable platform portion configured to rotate; and one or more supply containers disposed in the base portion and connected to each of the plurality of tools to supply the each of the plurality of tools.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means or can be implemented through a desired algorithm. Example implementations as described herein can be utilized either singularly or in combination and the functionality of the example implementations can be implemented through any means according to the desired implementations.

Figure 1:
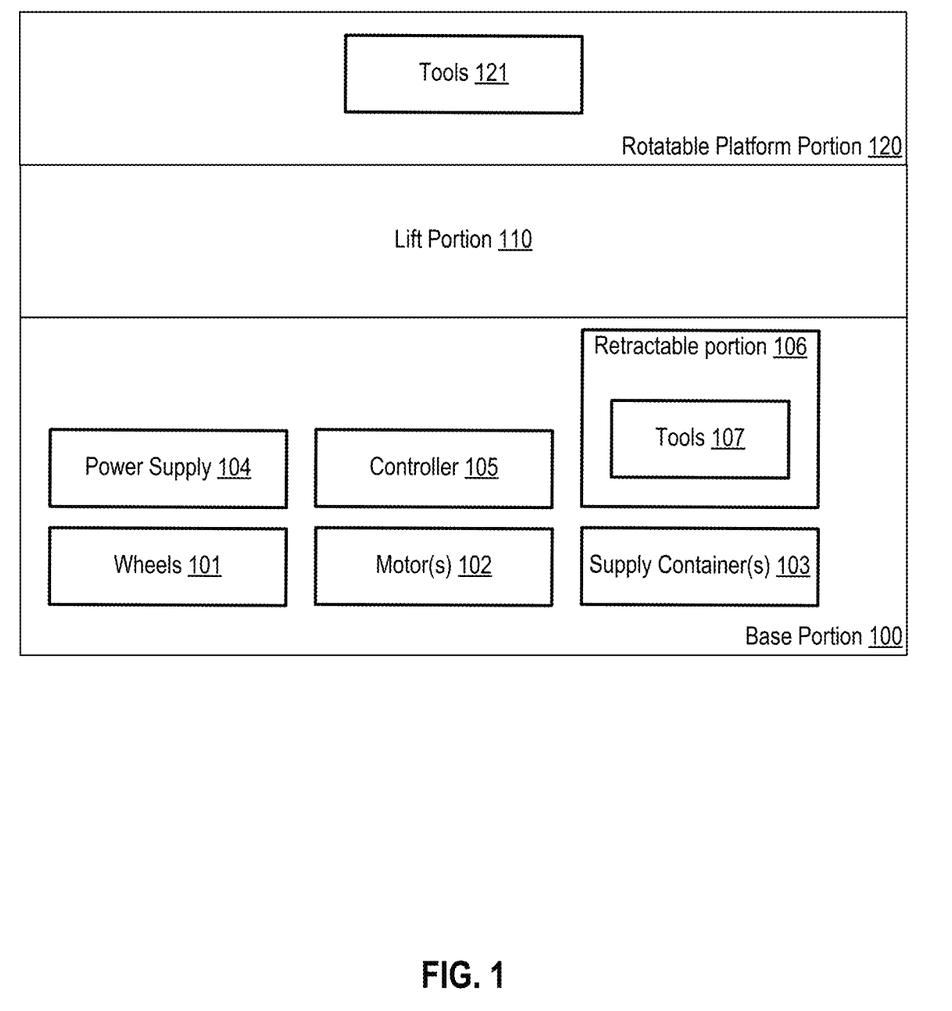
FIG. 1 illustrates a functional diagram of the construction workstation, in accordance with an example implementation.

FIG. 1 illustrates a functional diagram of the construction workstation, in accordance with an example implementation. In example implementations described herein, the construction workstation can include a base portion 100, a lift portion 110, and a rotatable platform portion 120. Depending on the desired implementation, the base portion 100 can involve wheels 101, one or more motors 102, one or more supply containers 103, power supply 104, controller 105, and retractable portion 106 having a plurality of tools 107. The lift portion 110 can be a scissor lift, an electrical left, an elevator, and so on, depending on the desired implementation. The rotatable platform portion 120 can involve a plurality of tools 121. Examples of tools that can be placed in the plurality of tools 107 or 121 can include, but are not limited to, a drywall gun, spray nozzle, robotic arm, nail gun, paint gun, and so on in accordance with the desired implementation.

One or more motors 102 can be installed into the base portion 100 to facilitate the operation of functions of the construction workstation. For example, a stepping motor can be used to control the movement of the lift portion 110 so that incremental movements are favored, which can help with precise requirements such as nail guns (e.g., nails placed every four inches). Another motor can be used to control the movement of the base portion 100 as well as for the turning or rotation of the wheels. Another motor can be used to control the retractable portion 106.

Figure 7:
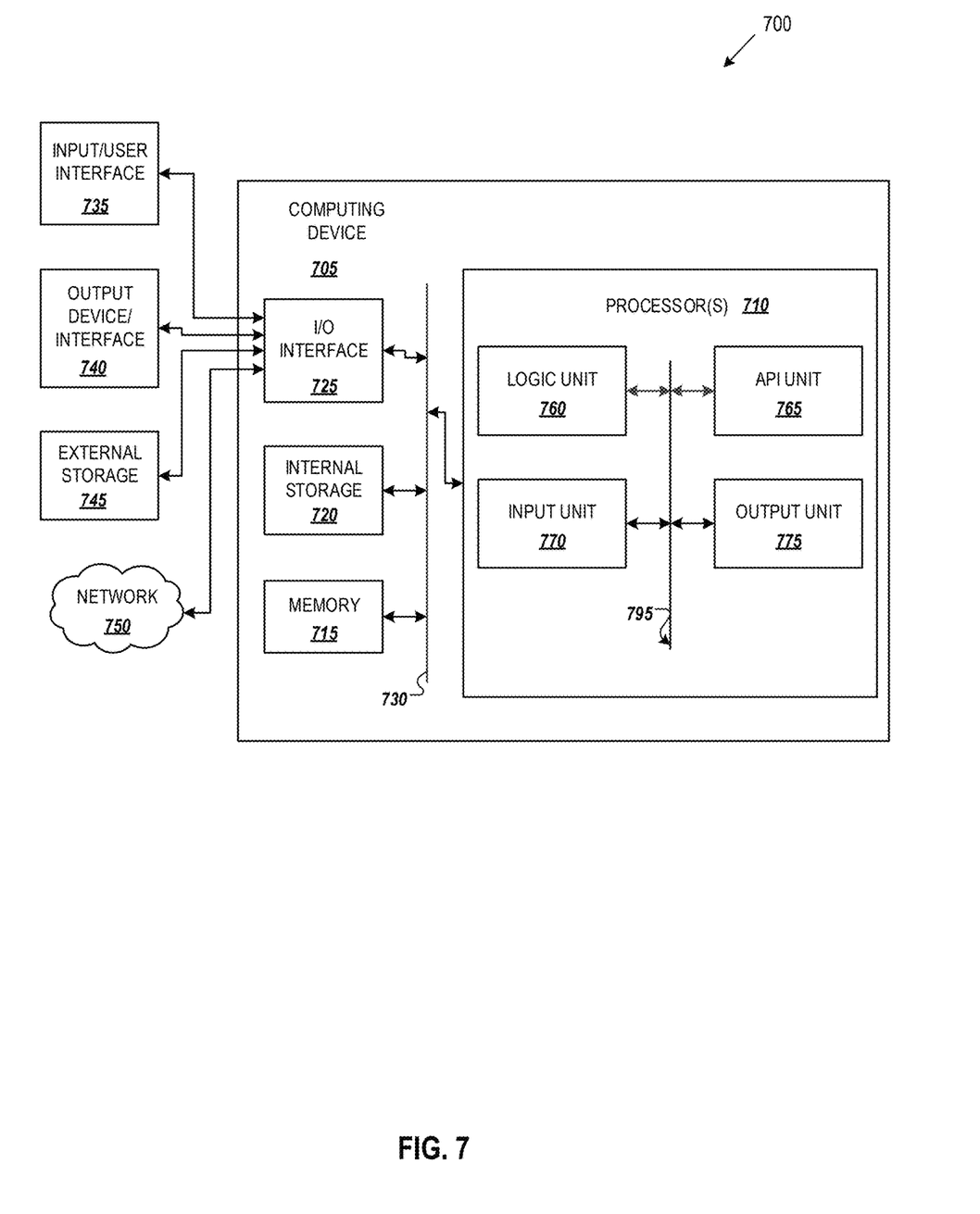
FIG. 7 illustrates an example computing environment with an example computer device suitable for use in some example implementations.

Controller 105 can take any desired form to facilitate the desired implementation. In an example implementation, the controller 105 can take the form of a control panel with a processor and memory to function similarly to a computer or computer platform as illustrated in FIG. 7. Such a controller 105 can include an interface to receive inputs to program the construction workstation to execute the desired functions and otherwise exercise control of the construction workstation. In example implementations, the controller 105 is configured to control the movement of the base portion 100, the lift portion 110 and the rotatable platform portion 120 to facilitate the desired implementation. Controller 105 can be configured to control the actuation of the rotatable platform portion 120 as well as the retractable portion 106 to rotate or move as needed. Controller 105 can also be configured to control the one or more motor(s) 102 to control the movement of the lift portion 110 and the wheels 101 of the base portion 100 to move the lift portion 110 and base portion 100 as desired. In addition, controller 105 can include manual controls (e.g., levers, buttons, etc.) for physical control of the components of the construction workstation.

In another example implementation, controller 105 can be made of a processor, a network interface, and a memory to facilitate operations via a remote user device, such as a mobile phone, a tablet, a laptop or personal computer, or otherwise in accordance with the desired implementation. Such communications between remote user device and the controller 105 of the construction workstation can be conducted wirelessly (e.g., via local area network or wide area network) as desired.

Controller 105 can be configured to be connected to the plurality of tools 107, 121 through any desired implementation to facilitate control of the operation of the plurality of tools by the controller. This can include, but is not limited to, wired connections, mechanical triggers controlled by electrical inputs from the controller 105, wireless connections to the plurality of tools connected by local area network, and so on depending on the desired implementation.

Power supply 104 can be in the form of any power supply in accordance with the desired implementation, such as rechargeable battery, plug-in, and so on.

Supply container(s) 103 contain supplies for the plurality of tools 107, 121, to hold the appropriate supplies for the tools installed, such as different paint colors, compressed air and nails for the nail gun, mud for the mud spray, water for the water spray, and so on in accordance with the desired implementation. The supply containers can be attached to the corresponding tool and supplied through the desired interconnection (e.g., loading mechanism, tubing/piping, etc.)

As described herein, example implementations involve a construction workstation, which can include a base portion 100 involving a plurality of wheels 101 configured to move the construction workstation; a lift portion 110 connected to the base portion 100; a rotatable platform portion 120 configured to be raised or lowered by the lift portion 110, the rotatable portion including a plurality of tools 121 installed on the rotatable platform portion 120, the plurality of tools 121 facing outward from the construction workstation, the rotatable platform portion 120 configured to rotate; and one or more supply containers 103 disposed in the base portion 100 and connected to each of the plurality of tools 121, 107 to supply the each of the plurality of tools 121, 107.

As described herein, controller 105 is configured to control rotation of the rotatable platform portion 120 based on input to direct a tool from the plurality of tools 121 towards a location for a construction operation. The controller 105 can involve a processor and a network interface configured to interface with an external user device, wherein the controller 105 is configured to control the lift portion 110, movement of the construction workstation, rotation of the rotatable platform portion 120, and operation of the plurality of tools 121, 107 from instructions received by the external user device. In another example implementation, the controller 105 can be configured to receive the input from a control panel (not illustrated) attached to the construction workstation (e.g., to base portion 100). Controller 105 can also be configured to control operation of the retractable portion 106 and the another plurality of tools 107.

Figure 5:
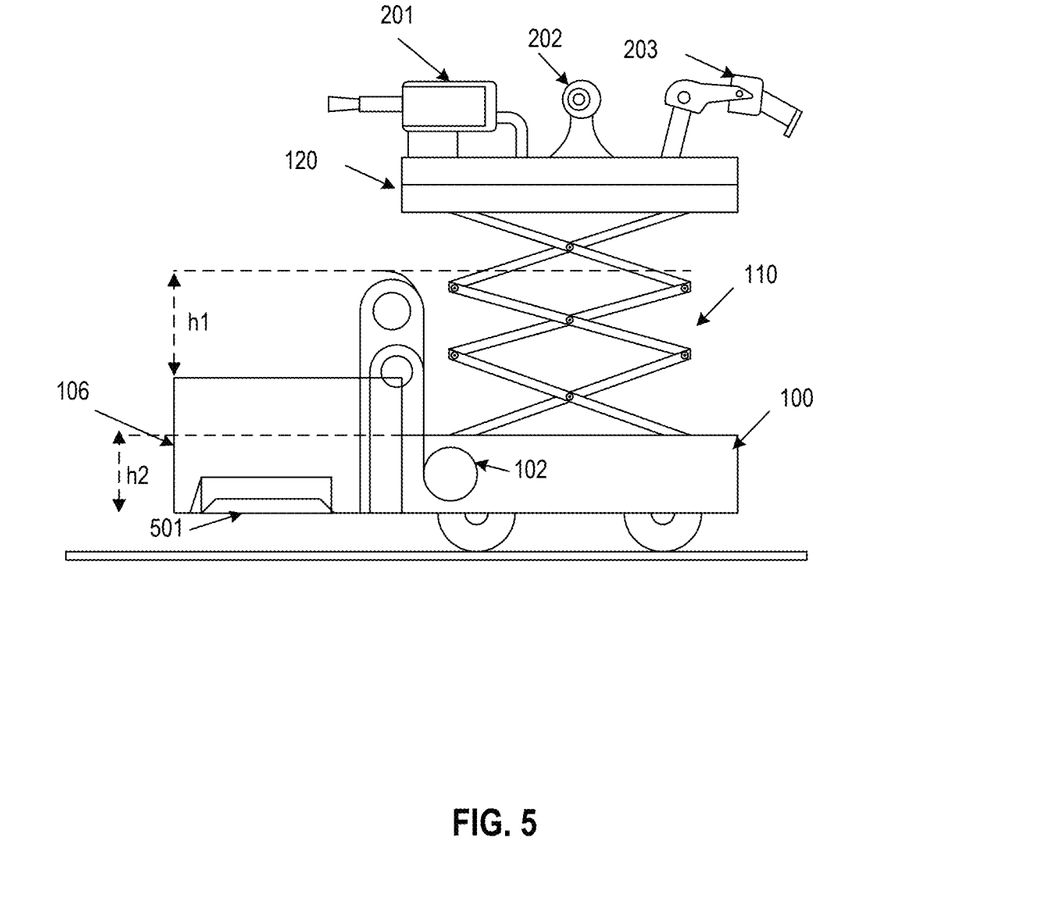
FIG. 5 illustrates an example configuration of the construction workstation with the retractable portion, in accordance with an example implementation.

As described herein, the construction workstation may further include a retractable portion 106 connected to the base portion 100, the retractable portion 106 including a tool holding portion 501 having another plurality of tools 107, the retractable portion 106 configured to be lowered to a height h2 at or below the base portion 100, or to the clearance height h1. The retractable portion 106 can be similar in construction to the rotatable platform portion 120. For example, each of the another plurality of tools 107 can be installed onto a corresponding slot of the retractable portion 106 and is configured to be removable. Similarly, each of the another plurality of tools 107 is configured to be installed on a corresponding panel portion of the retractable portion 106, wherein the corresponding panel portion is configured to be removable.

The retractable portion 106 can controllable by the controller 105 in a similar manner to the control of the rotatable platform portion 120. For example, the controller 105 can be configured to control rotation of the tool holding portion 501 based on input to direct a tool from the another plurality of tools 107 towards a location for a construction operation. In an example implementation where the controller involves a processor and a network interface configured to interface with an external user device, the controller 105 can be configured to control movement of the retractable portion 106 (e.g., to be retracted or engaged by motors 102), unfolding of the tool holding portion 501, the rotation of the tool holding portion 501, and operation of the another plurality of tools 107 from instructions received by the external user device. In another example implementation, such input or instructions are received by the controller 105 through a control panel attached to the construction workstation.

As described herein, each of the plurality of tools 121 can be installed onto a corresponding slot of the rotatable platform portion 120 and can be configured to be removable. In another example implementation, each of the plurality of tools can be configured to be installed on a corresponding panel portion of the rotatable platform portion, wherein the corresponding panel portion is configured to be removable.

Example configurations of the functional diagram of FIG. 1 are outlined herein as follows.

Figure 2:
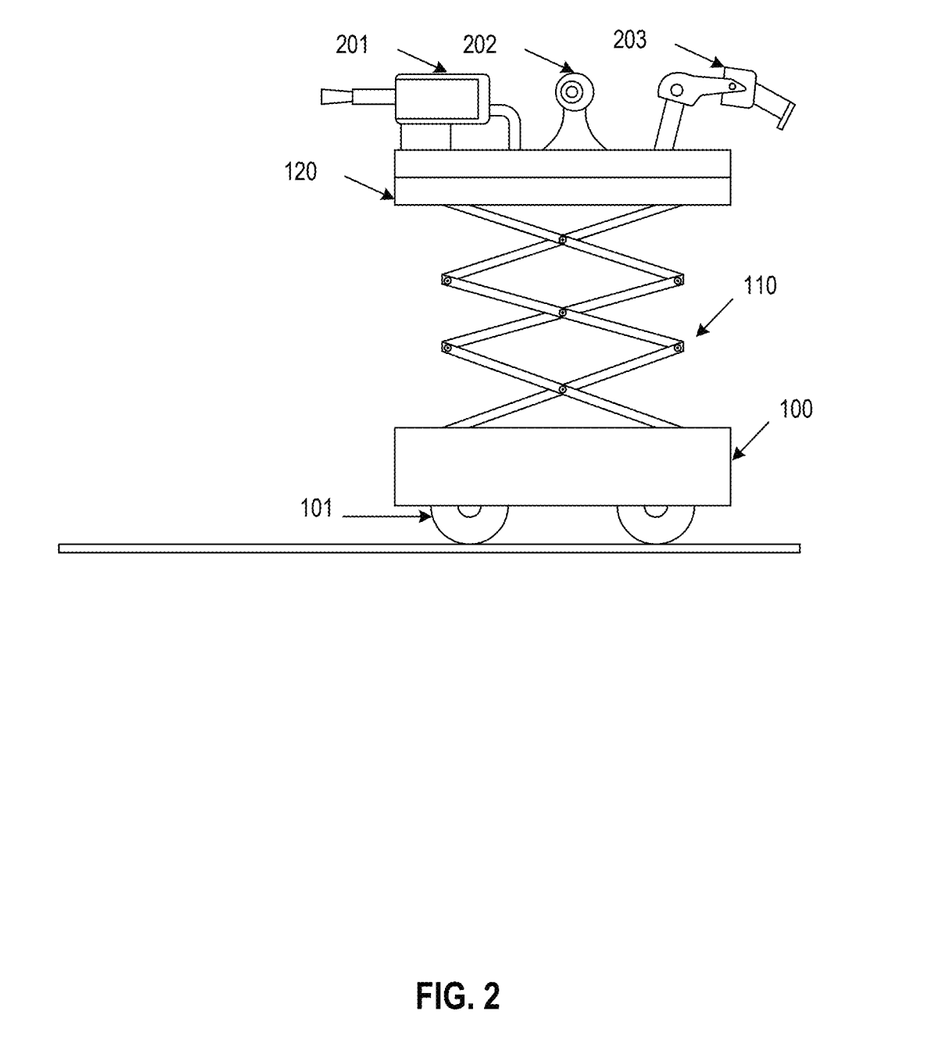
FIG. 2 illustrates an example configuration of the construction workstation, in accordance with an example implementation.

FIG. 2 illustrates an example configuration of the construction workstation, in accordance with an example implementation. As illustrated in FIG. 2, the lift portion 110 can be a scissor lift, but is not limited thereto and other lifts or elevators can also be used to facilitate the desired implementation. For example, a straight up elevator with no scissor portion can be utilized. In home constructions, the inside wall can be anywhere from 8 to 12 feet tall, and the maximum height of the lift can be configured to facilitate the desired implementation for use in home constructions or other implementations.

The base portion 100 can be remote controlled to move back and forth, to turn, as well as to rotate in accordance with the desired implementation. Such movement can be facilitated by wheels as shown in FIG. 2.

On the top of the lift portion 110 is a rotatable platform portion 120 that holds a plurality of tools 121. Example of tools as shown in FIG. 2 include a drywall/sheet wall gun 201, a spray nozzle 202, a robotic arm 203, and so on in accordance with a desired implementation. The rotatable platform portion 120 can be in the form of a round table (e.g., donut shaped round table), or can involve another shape in accordance with an example implementation. The rotatable platform portion 120 can be independently rotatable to the base portion 100 (e.g., via actuators and a motor, or otherwise in accordance with the desired implementation). In other example implementations, the rotatable platform portion 120 can be manually rotatable, or can be static and rotated through rotation of the base portion 100. Depending on the desired implementation, the rotatable platform portion 120 can also be removable for placement onto another workstation or for replacement with another rotatable platform portion 120 having its own set of tools.

Base portion 100 can also supply the plurality of tools 121 through use of supply containers (not illustrated) installed in the base portion. Such a supply container can hold the appropriate supplies for the tools installed, for example, compressed air and nails for the nail gun, mud for the mud spray, water for the water spray, and so on in accordance with the desired implementation. The supply containers can be attached to the corresponding tool and supplied through the desired interconnection (e.g., loading mechanism, tubing/piping, etc.)

Figure 3:
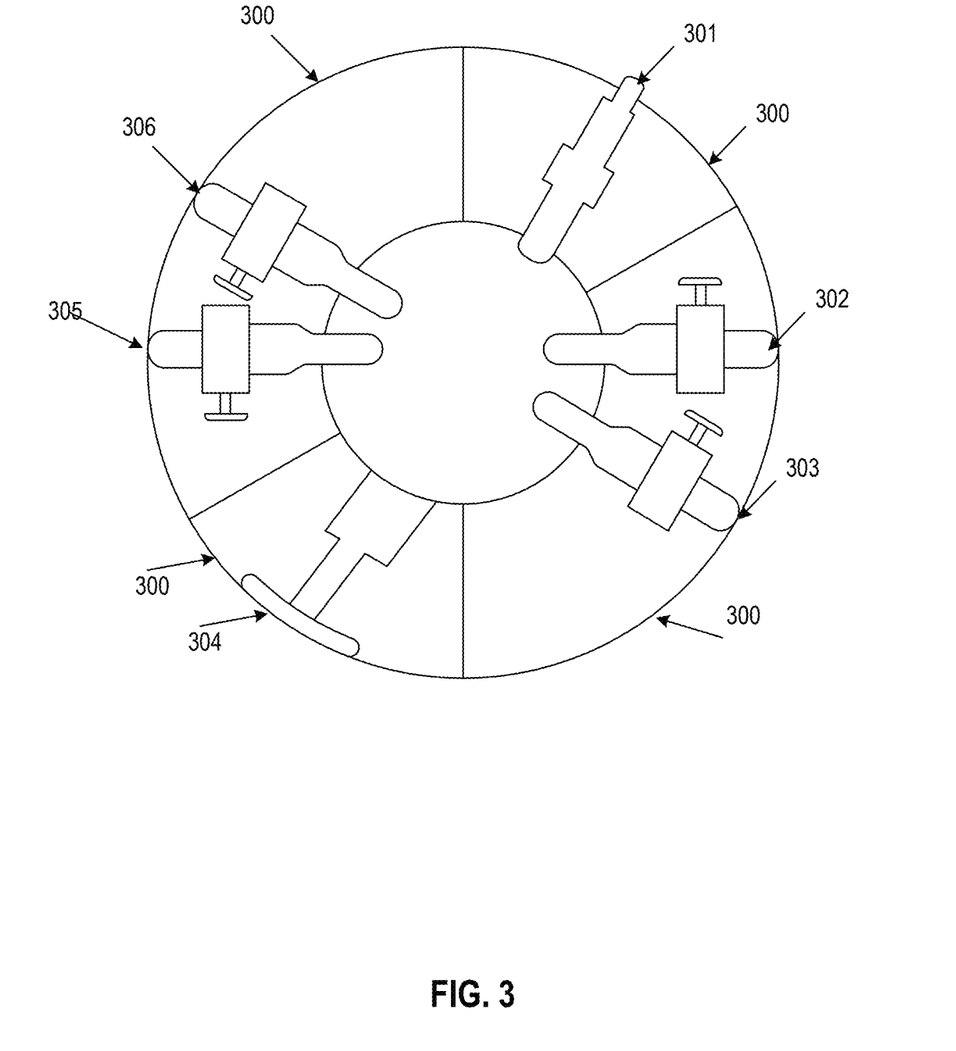
FIG. 3 illustrates an example top view of the rotatable platform portion, in accordance with an example implementation.

FIG. 3 illustrates an example top view of the rotatable platform portion 120, in accordance with an example implementation. In an example, the rotatable platform portion 120 is composed of one or more sections 300, each of which can be configured to hold one or more interchangeable tools. In an example, the tools illustrated in FIG. 3 include a screw gun/nail gun 301, a mud spray 302, a wash spray 303, a wiping arm 304, a prime paint sprayer 305, and a finishing paint sprayer 306.

The tools on each of the one or more sections 300 can be made interchangeable through various different implementations. For example, each of the one or more sections 300 can have one or more slots (not illustrated) with holders or mechanical latches that can secure one or more tools in the one or more sections 300 while permitting them to be removed for replacement with another tool, for use by a mechanical arm, or otherwise controlled in accordance with the desired implementation. Such slots can allow the one or more tools to be removable and therefore replaceable with other tools to facilitate the desired implementation. In another example implementation, the one or more sections 300 can be in the form of removable panels that can be removed to be switched with another tool attached to a removeable panel.

Figure 4:
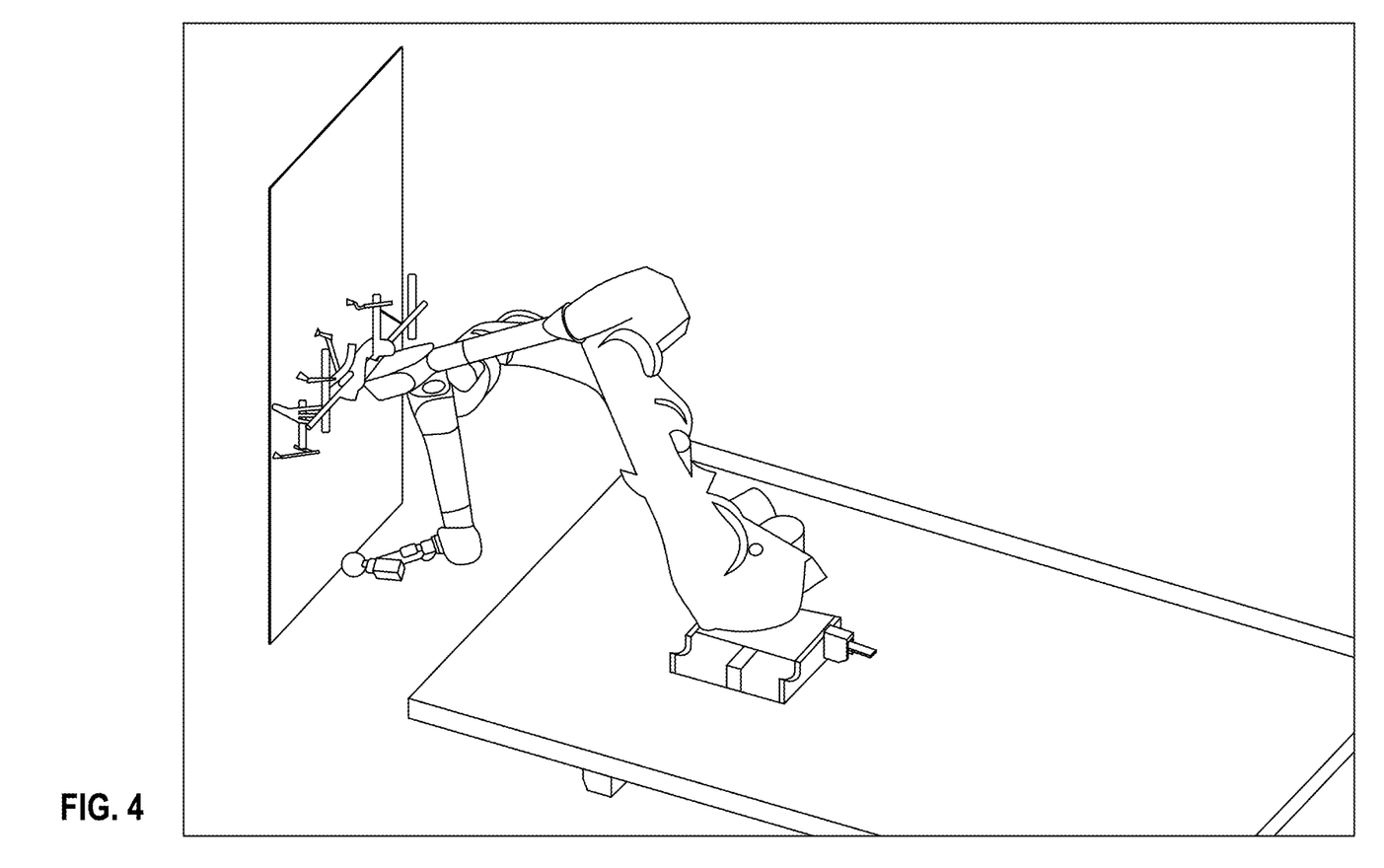
FIG. 4 illustrates an example of a robotic arm on the rotatable platform configured to handle drywall, in accordance with an example implementation.

FIG. 4 illustrates an example of a robotic arm on the rotatable platform configured to handle drywall, in accordance with an example implementation. Because the tools are rotatable and because the example implementations involve a movable base portion 110, it is possible to execute construction functions in a two-dimensional manner. FIG. 4 illustrates an example of handling sheet rock in which the only considerations needed are the lateral axis (left/right) and the depth axis (forward, back) for using the robotic arm to install a sheet rock at a desired implementation. In this example, the height of the robotic arm is controlled by the engagement of the lift portion by the controller 105, thereby simplifying the programming required for control of the robotic arm.

Although the example implementation of FIG. 4 illustrates an example with a robotic arm, other tools can function in a similar two-dimensional manner. Any construction plan involves the interior dimension and size and the construction workstation can be moved around and rotated to address the correct position, for example, a nail position for drywall for connecting the drywall to a stud. Such functionality can be programmed into to the controller 105 so that the height of the lift portion 110, movement of the base portion 100, and rotation of the rotatable platform portion 120 to the appropriate tool (e.g., nail gun) can be programmed and executed by the construction workstation. Such programming can be a step among a plurality of steps provided to the construction workstation for execution, to facilitate more complex processes by the construction workstation. An example process can be, for example, setting up and shooting nails every four inches along one side, rotating the platform to switch to a mud spray, spraying mud, then rotating to a wiping arm to wipe the excess mud, and finally rotating to the spray gun to spray on base paint. Such functions can be executed automatically by the construction workstation when provided with proper instructions to the controller 105 and having the proper tools installed on the rotatable platform portion 120.

Other functions can also be programmed in a similar manner (e.g., painting a picture with multiple colors), which can therefore achieve sufficient results with minimum human labor. Further, because of the flexibility of control regarding the length, width, and height of operation, this can ensure safety as such construction jobs could be dangerous due to the required heights or locations for the job.

The example implementations can improve on a pure mechanical arm implementation as a mechanical arm will require three-dimensional movement to be facilitated. Programmer will have to calculate where the hands or finger positions are to be for the mechanical arm, how to hold an object and position an object. In contrast, because the height and lengths are adjustable in the construction workstation through rotation of the rotatable platform portion 120, movement by the lift portion 110, and movement from the base portion 100, only two-dimensional programming is required for the tools installed on the construction workstation.

FIG. 5 illustrates an example configuration of the construction workstation with the retractable portion, in accordance with an example implementation. As the base portion 100 itself will cause the workstation to be at an elevated height, there may be a need to execute functions at the height below that of the base portion 100 itself (e.g., at the height of the base portion 100, under the base portion 100, etc.). Accordingly, a retractable portion 106 having its own corresponding plurality of interchangeable tools 107 may also be installed into the base portion 100 and be configured to be retracted to reveal the tools as desired. In the example of FIG. 5, the retractable portion 106 includes a tool holding portion 501 that is configured to unfold out laterally, however, other configurations are also possible and the example implementations are not limited thereto. The retractable portion 106 can be lowered or raised, and retracted into the base portion 100 (e.g., folded over via gears and pulleys, or through an opening in base portion 100, or other implementations in accordance with the desired implementations) to adjust the height of the tool holding portion 501 so that another set of tools can reach a lower portion of a wall or construction job that is being worked upon. The tool holding portion 501 is also configured to be rotatable, either independently via motors and actuators, or otherwise in accordance with the desired implementation. Such tools 107 can also be supplied by supply containers (not shown) installed into the base portion 100 in a similar manner as described herein.

Depending on the desired implementation, the retractable portion 106 with tool holding portion 501 can function essentially identically to the rotatable platform portion 120 and have the tools be interchangeable in the same manner. The retractable portion 106 can be lowered by any desired mechanism (e.g., via pulleys, via an extendible portion configured to lower the retractable portion 106 below the base portion 100, and so on), and be powered and actuated accordingly by motors and actuators.

Figure 6:
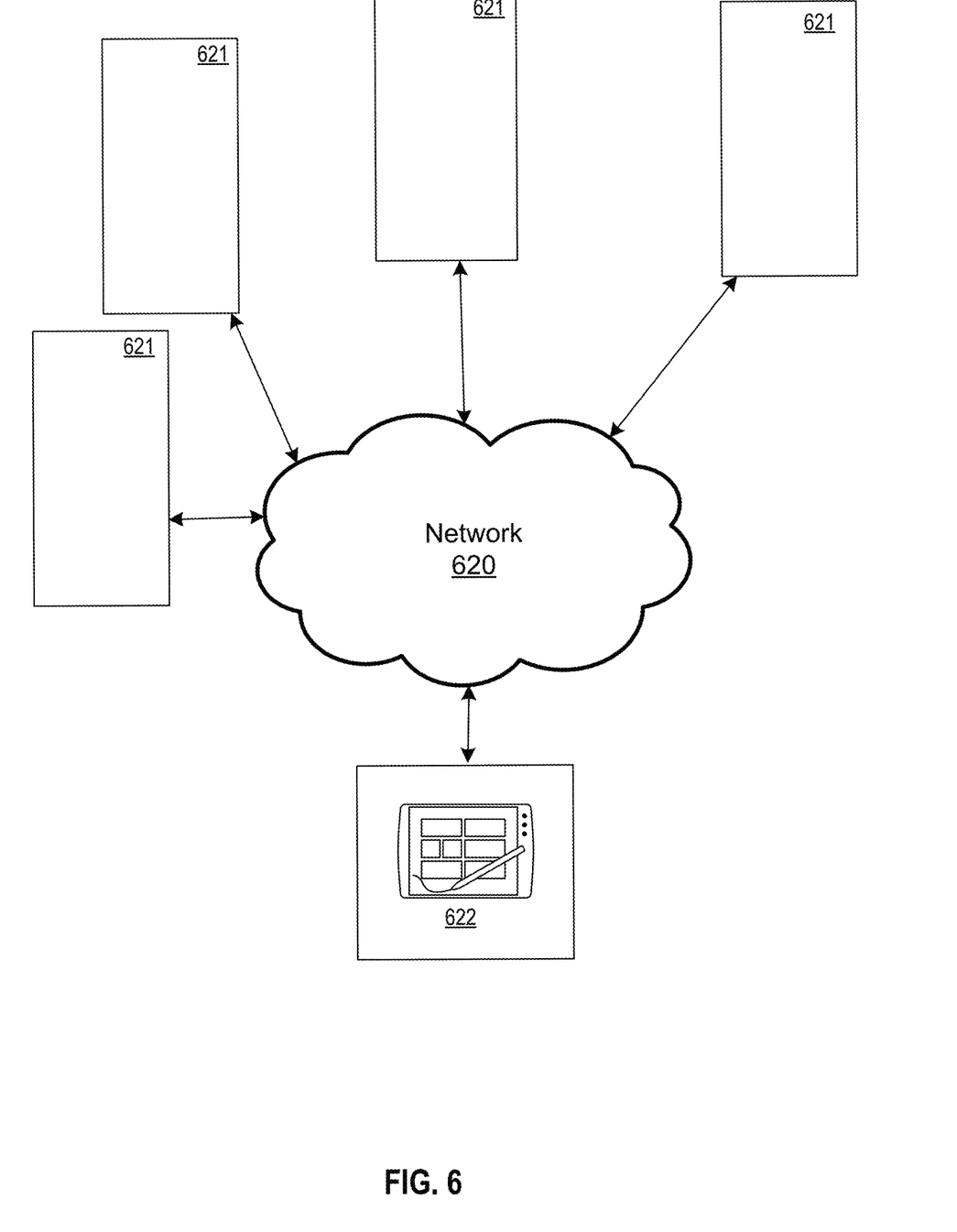
FIG. 6 illustrates a plurality of construction workstations that are networked to a management apparatus, in accordance with an example implementation.

FIG. 6 illustrates a plurality of construction workstations that are networked to a management apparatus, in accordance with an example implementation. One or more construction workstations 621 as described herein can be communicatively coupled to a network 620 (e.g., local area network (LAN), wide area network (WAN)) through the corresponding network interface of the sensor system installed in the construction workstations 621, which is connected to a management apparatus 622 configured to facilitate control of each of the construction workstations 621 to execute the desired construction jobs. Such a management apparatus 622 can take the form of a computer device (e.g., laptop, mobile device, tablet, etc.) as described with respect to FIG. 7. Accordingly, the controller 105 of each of the construction workstations 621 can be connected to a network through their network interface, and execute operations (e.g., to control the lift portion, movement of the construction workstation, rotation of the rotatable platform portion, and operation of the plurality of tools) from instructions received through the network.

FIG. 7 illustrates an example computing environment with an example computer device suitable for use in some example implementations, such as the management apparatus 622. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided. Processor(s) 710 can be in the form of hardware processors such as central processing units (CPUs) or in a combination of hardware and software units.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A construction workstation, comprising:
    a base portion comprising a plurality of wheels configured to move the construction workstation;
    a lift portion connected to the base portion;
    a rotatable platform portion configured to be raised or lowered by the lift portion, the rotatable platform portion comprising a plurality of tools installed on the rotatable platform portion, the plurality of tools facing outward from the construction workstation, the rotatable platform portion configured to rotate;
    a retractable portion connected to the base portion, the retractable portion comprising a tool holding portion comprising another plurality of tools, the retractable portion configured to be lowered to a height at or below the base portion; and
    one or more supply containers disposed in the base portion and connected to corresponding ones of the plurality of tools to supply the corresponding ones of the plurality of tools.

2. The construction workstation of claim 1, further comprising a controller configured to control rotation of the rotatable platform portion based on input to direct a tool from the plurality of tools towards a location for a construction operation.

3. The construction workstation of claim 2, wherein the controller comprises a processor and a network interface configured to interface with an external user device, the controller configured to control the lift portion, movement of the construction workstation, rotation of the rotatable platform portion, and operation of the plurality of tools from instructions received by the external user device.

4. The construction workstation of claim 2, wherein the controller is configured to receive the input from a control panel attached to the construction workstation.

5. The construction workstation of claim 1, wherein the tool holding portion is configured to unfold out laterally from the retractable portion.

6. The construction workstation of claim 1, wherein the tool holding portion is configured to rotate.

7. The construction workstation of claim 1, wherein a controller is configured to control operation of the retractable portion and the another plurality of tools.

8. The construction workstation of claim 1, wherein each of the another plurality of tools is installed onto a corresponding slot of the retractable portion and is configured to be removable.

9. The construction workstation of claim 1, wherein each of the another plurality of tools is configured to be installed on a corresponding panel portion of the retractable portion, wherein the corresponding panel portion is configured to be removable.

10. The construction workstation of claim 1, further comprising a controller configured to control rotation of the tool holding portion based on input to direct a tool from the another plurality of tools towards a location for a construction operation.

11. The construction workstation of claim 10, wherein the controller comprises a processor and a network interface configured to interface with an external user device, the controller configured to control movement of the retractable portion, unfolding of the tool holding portion, the rotation of the tool holding portion, and operation of the another plurality of tools from instructions received by the external user device.

12. The construction workstation of claim 10, wherein the controller is configured to receive the input from a control panel attached to the construction workstation.

13. The construction workstation of claim 1, wherein each of the plurality of tools is installed onto a corresponding slot of the rotatable platform portion and is configured to be removable.

14. The construction workstation of claim 1, wherein each of the plurality of tools is configured to be installed on a corresponding panel portion of the rotatable platform portion, wherein the corresponding panel portion is configured to be removable.

15. The construction workstation of claim 1, further comprising a controller, wherein the controller comprises a network interface configured to be connected to a network, wherein the controller receives instructions to control the lift portion, movement of the construction workstation, rotation of the rotatable platform portion, and operation of the plurality of tools from instructions received through the network.

16. The construction workstation of claim 1, wherein the lift portion is a scissor lift.

17. The construction workstation of claim 1, wherein the plurality of tools comprises a robotic arm, wherein a controller is configured to control movement of the robotic arm along a lateral axis and a depth axis, wherein the controller is configured to adjust height of the robotic arm through control of the lift portion.

18. The construction workstation of claim 1, wherein the plurality of tools comprises a mud spray gun and a water spray gun.

19. The construction workstation of claim 1, wherein the plurality of tools comprises a nail gun.

* * * * *